(12) United States Patent
Twiss et al.

(10) Patent No.: US 8,806,355 B2
(45) Date of Patent: Aug. 12, 2014

(54) METHOD AND APPARATUS FOR VISUALIZING AND NAVIGATING WITHIN AN IMMERSIVE COLLABORATION ENVIRONMENT

(75) Inventors: Robert Gregory Twiss, Chapel Hill, NC (US); Errol Fenton Roberts, Ardsley, NY (US); William Henry Morrison, IV, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 919 days.

(21) Appl. No.: 12/613,674

(22) Filed: Nov. 6, 2009

(65) Prior Publication Data

US 2011/0113348 A1     May 12, 2011

(51) Int. Cl.
  *G06F 3/0481*  (2013.01)
  *G06Q 10/10*  (2012.01)

(52) U.S. Cl.
  CPC ..................................... *G06Q 10/10* (2013.01)
  USPC ............ 715/753; 715/751; 715/757; 715/764

(58) Field of Classification Search
  CPC .................................................. G06F 3/0481
  USPC .......................................................... 715/753
  See application file for complete search history.

(56) References Cited

U.S. PATENT DOCUMENTS

| | | | | |
|---|---|---|---|---|
| 6,336,134 | B1 * | 1/2002 | Varma | 709/205 |
| 7,421,660 | B2 * | 9/2008 | Charnock et al. | 715/751 |
| 7,506,263 | B1 * | 3/2009 | Johnston et al. | 715/752 |
| 7,707,249 | B2 * | 4/2010 | Spataro et al. | 709/205 |
| 7,844,724 | B2 * | 11/2010 | Van Wie et al. | 709/231 |
| 7,944,445 | B1 * | 5/2011 | Schorr et al. | 345/440 |
| 7,999,810 | B1 * | 8/2011 | Boice et al. | 345/473 |
| 8,037,046 | B2 * | 10/2011 | Udezue et al. | 707/706 |
| 2004/0153456 | A1 * | 8/2004 | Charnock et al. | 707/10 |
| 2005/0010874 | A1 * | 1/2005 | Moder et al. | 715/751 |
| 2007/0245238 | A1 * | 10/2007 | Fugitt et al. | 715/700 |
| 2008/0034039 | A1 * | 2/2008 | Cisler et al. | 709/204 |
| 2008/0294663 | A1 * | 11/2008 | Heinley et al. | 707/100 |
| 2009/0012961 | A1 * | 1/2009 | Bramson et al. | 707/9 |
| 2009/0254842 | A1 * | 10/2009 | Leacock et al. | 715/757 |
| 2010/0061276 | A1 * | 3/2010 | Havens et al. | 370/260 |
| 2010/0262950 | A1 * | 10/2010 | Garland | 717/113 |
| 2010/0333132 | A1 * | 12/2010 | Robertson et al. | 725/32 |
| 2011/0087976 | A1 * | 4/2011 | Cisler et al. | 715/762 |
| 2011/0246922 | A1 * | 10/2011 | Koenig et al. | 715/771 |
| 2011/0252093 | A1 * | 10/2011 | Spataro et al. | 709/204 |
| 2012/0013621 | A1 * | 1/2012 | Ospina Gonzalez | 345/473 |

* cited by examiner

*Primary Examiner* — William Bashore
*Assistant Examiner* — Reza Nabi
(74) *Attorney, Agent, or Firm* — P. Su

(57) ABSTRACT

In one embodiment, a method includes obtaining collaboration data from at least one data source, and mapping the collaboration data into a visual representation in a collaboration space. The visual representation is arranged to be manipulated to cause details associated with the collaboration to be displayed in the collaboration space. Finally, the method includes enabling manipulations of the visual representation.

23 Claims, 11 Drawing Sheets

METHOD AND APPARATUS FOR VISUALIZING AND NAVIGATING WITHIN AN IMMERSIVE COLLABORATION ENVIRONMENT

BACKGROUND

The disclosure relates generally to networking, and more particularly to immersive collaboration environments.

Immersive, virtual collaboration environments allow sets of workers, e.g., globally-dispersed knowledge workers, to collaborate on projects using mediums such as email, teleconferencing, video conferencing, and other networking mediums. Collaborative environments allow globally-dispersed knowledge workers to collaborate synchronously and asynchronously and, thus, readily share their information and experiences with other knowledge workers. Characteristics of a successful immersive environment often include, but are not limited to including, persistence, e.g., collaboration data is accessible throughout time, and pervasiveness, e.g., collaboration data is accessible to multiple distributed users employing multiple communication device types. For example, a knowledge worker in one country may run experiments which a knowledge worker in another country may access simultaneously or later through a collaborative environment. An immersive environment may generally specify attributes which include persistence, pervasiveness, and/or a number of dimensions associated therewith. For instance, an immersive environment may be two-dimensional, three-dimensional, or four-dimensional.

In general, collaborative data that is created by members of a collaboration environment may be accessed by other members. Often, particularly for large, globally distributed, or complex collaborative projects such as those involving a relatively high number of knowledge workers, the amount of collaborative data generated may be so high that it becomes difficult to track all the collaborative data. As such, it may become difficult for a user or groups of users to locate and reuse meaningful data, e.g., data that is particularly relevant to a particular aspect of the overall collaborative project, and to make meaningful present and future use of the data.

BRIEF DESCRIPTION OF THE DRAWINGS

The invention will be readily understood by the following detailed description in conjunction with the accompanying drawings in which.

DESCRIPTION OF EXAMPLE EMBODIMENTS

General Overview

Figure 1:
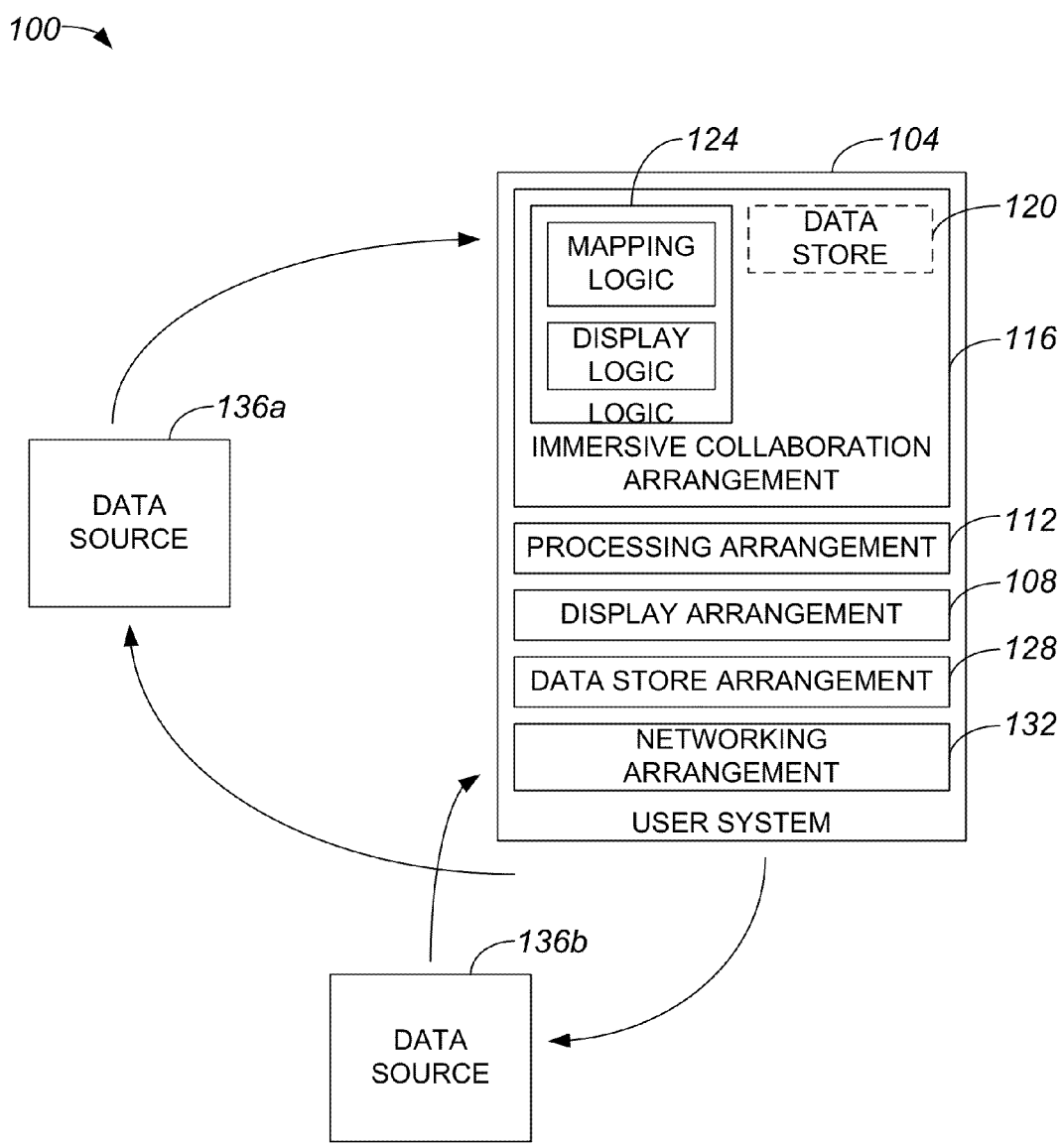
FIG. 1 is a diagrammatic representation of a network in which a user system includes an immersive collaboration arrangement in accordance with an embodiment.

According to one aspect, a method includes obtaining collaboration data from at least one data source, and mapping the collaboration data into a visual representation in a collaboration space. The visual representation is arranged to be manipulated to cause details associated with the collaboration to be displayed in the collaboration space. Finally, the method includes permitting, enabling, or supporting manipulations of the visual representation.

Description

The ability to efficiently search, organize, prioritize, and/or otherwise use data associated with a collaborative project, an interface may be provided to allow members of a collaborative project to manage the collaborative project, as well as any other collaborative projects with which the members may be associated. It should be appreciated that a collaborative project is generally a collaboration supported by and/or within an immersive, collaboration environment.

To enable collaborative data, or data generated or otherwise obtained with respect to a collaborative project, as well as personal data to be efficiently accessed and used, an interface may be provided to allow the collaborative data to be readily visualized. When collaborative data may be readily visualized by a user, e.g., a knowledge worker or a member of a collaborative project, the user may be able to effectively navigate through the data, as for example to identify particular pieces of the data that are relevant to the needs of the user.

In one embodiment, an immersive collaboration system provides a display which allows a collaborative project to be visually presented includes a collaboration mapping. A collaboration mapping may be a representation of a dynamic timeline that discretely displays aggregate collaboration events and data. Such a dynamic timeline includes an interface which allows users to efficiently visualize, navigate, manipulate, and/or re-use collaboration information. By way of example, a dynamic timeline may be arranged to display collaborative data relating to conference calls and documents in such a way as to allow the conference calls and documents to be readily identified and, thus, to allow information relating to the conference calls and documents to be utilized. A dynamic timeline may generally be included in a collaboration space that provides an overall interface through which a user may access collaborative data.

An immersive collaboration system may be substantially arranged on a computing system of a user, e.g., a member of a collaborative project, and arranged to obtain data from different sources to which the computing system is networked. It should be appreciated that the computing system may generally be any suitable computing system, e.g., a substantially fixed computing system or a mobile computing system. Alternatively, an immersive collaboration system may effectively be arranged on a centralized server that a user may access through a network using his or her computing system, and arranged to obtain data from different sources on the network. The computing system of a user may generally be any type of device which has a communications channel and is capable of allowing data to be viewed.

Referring initially to FIG. 1, a network in which a user system includes an immersive collaboration arrangement will be described in accordance with an embodiment. A network 100 may generally be any suitable network, e.g., a local are network or a wide area network, and is arranged to enable various devices to communicate with each other as necessary within a collaboration environment. A user system 104, which may be a computing device that is associated with a user, and any number of data sources 136a, 136b are in communication within network 100. Data sources 136a, 136b may be substantially standalone databases, or may be associated with computing devices (not shown) associated with various users.

User system 104 includes an immersive collaboration arrangement 116 that is configured to substantially permit, enable, or support at least one collaborative project that a user of user system 104 is a member of. In one embodiment, immersive collaboration arrangement 116 includes software and/or hardware logic. The software logic may include, but is not limited to including, code devices embodied on a hardware component such as a memory. User system 104 also includes a processing arrangement 112, a display arrangement 108, a data store arrangement 128, and a networking arrangement 132.

Immersive collaboration arrangement 116 is configured to facilitate the management and organization of collaborative data, including events, and to provide a user with an integrated interface which allows the user to manipulate collaborative data. An integrated interface may be, in one embodiment, a single visual interface or a visual interface associated with a collaboration space that allows a user to view and to manipulate collaborative data. A collaboration space is generally arranged to provide an indication of types of events associated with a collaborative project, and to visually represent events to a user in an organized, e.g., chronological, manner.

Immersive collaboration arrangement 116 includes logic 124 which implements functionality associated with immersive collaboration. Logic 124 includes mapping logic and display logic. Mapping logic may cause collaborative data associated with a collaborative project to be obtained from appropriate sources, e.g., data sources 136a, 136b and data store arrangement 128. Mapping logic may then process the collaborative data to determine how various pieces of collaborative data are related. Mapping logic may also effectively mine data sources 136a, 136b and data store arrangement 128 searching for particular information, e.g., keywords, and then process the data that includes the particular information. Display logic typically cooperates with mapping logic to determine how to display the various pieces of collaborative data within a collaboration space. In one embodiment, display logic determines the size, shape, and/or color to use in displaying a particular piece of collaborative data. Display logic generally determines how to visually present collaborative data that has been mapped or otherwise processed by mapping logic. In general, logic 124 may also include logic which allows the collaborative data to be manipulated within a collaboration space. It should be appreciated that logic 124 may also include logic which allows personal data, e.g., data that is not associated with a collaborative project, to be manipulated within the collaboration space.

Collaborative data obtained by logic 124 from external sources such as data sources 136a, 136b may be processed without being stored with respect to user system 104. That is, collaborative data may remain remote with respect to user system 104. It should be appreciated, however, that collaborative data obtained by logic 124 may be stored in an optional data store 120. In one embodiment, metadata which points to data stored in data sources 136a, 136b may be stored in optional data store 120.

In general, processing arrangement 112 is generally configured to cause logic associated with user system 104 to be executed. For example, processing arrangement 112 may cause logic 124 that is included in immersive collaboration arrangement 116 to be executed.

Display arrangement 108 may include a display screen which provides an interactive interface to immersive collaboration arrangement 116 such that a user may visualize and/or manipulate collaborative data. Display arrangement 108 is typically arranged to cause information provided by logic 124 to be displayed, e.g., as a graphical user interface.

Data store arrangement 128 may include a database, or other memory, in which data may be stored. Generally, data store arrangement 128 stores information associated with a user that may be accessed by immersive collaboration arrangement 116. It should be appreciated that such information may also be accessed by other immersive collaboration arrangements (not shown), e.g., such information may be accessed by an immersive collaboration arrangement of a system of another user as appropriate. In one embodiment, if data obtained by immersive collaboration arrangement 116 from data sources 136a, 136b is to be stored substantially locally with respect to user system 104, such data may be stored in data store arrangement 128 rather than in optional data store 120.

Networking arrangement 132 is configured to allow user system 104 to communicate with nodes, e.g., data sources 136a, 136b, within network 100. In general, networking arrangement 132 may includes input/output ports and interfaces that provide user system 132 with the ability to send and to receive data signals. Such interfaces may include, but are not limited to including, wired communications interfaces and wireless communications interfaces.

Data sources 136a, 136b generally store information that is associated with a collaborative project. For example, data sources 136a, 136b may store documents created as a part of a collaborative project. In one embodiment, data sources 136a, 136b may be databases or similar structures associated with an immersive collaboration application, or data sources 136a, 136b may be databases or similar structures associated with computing systems of other users (not shown) associated with a collaborative project that the user of user system 104 is a member of.

Figure 2:
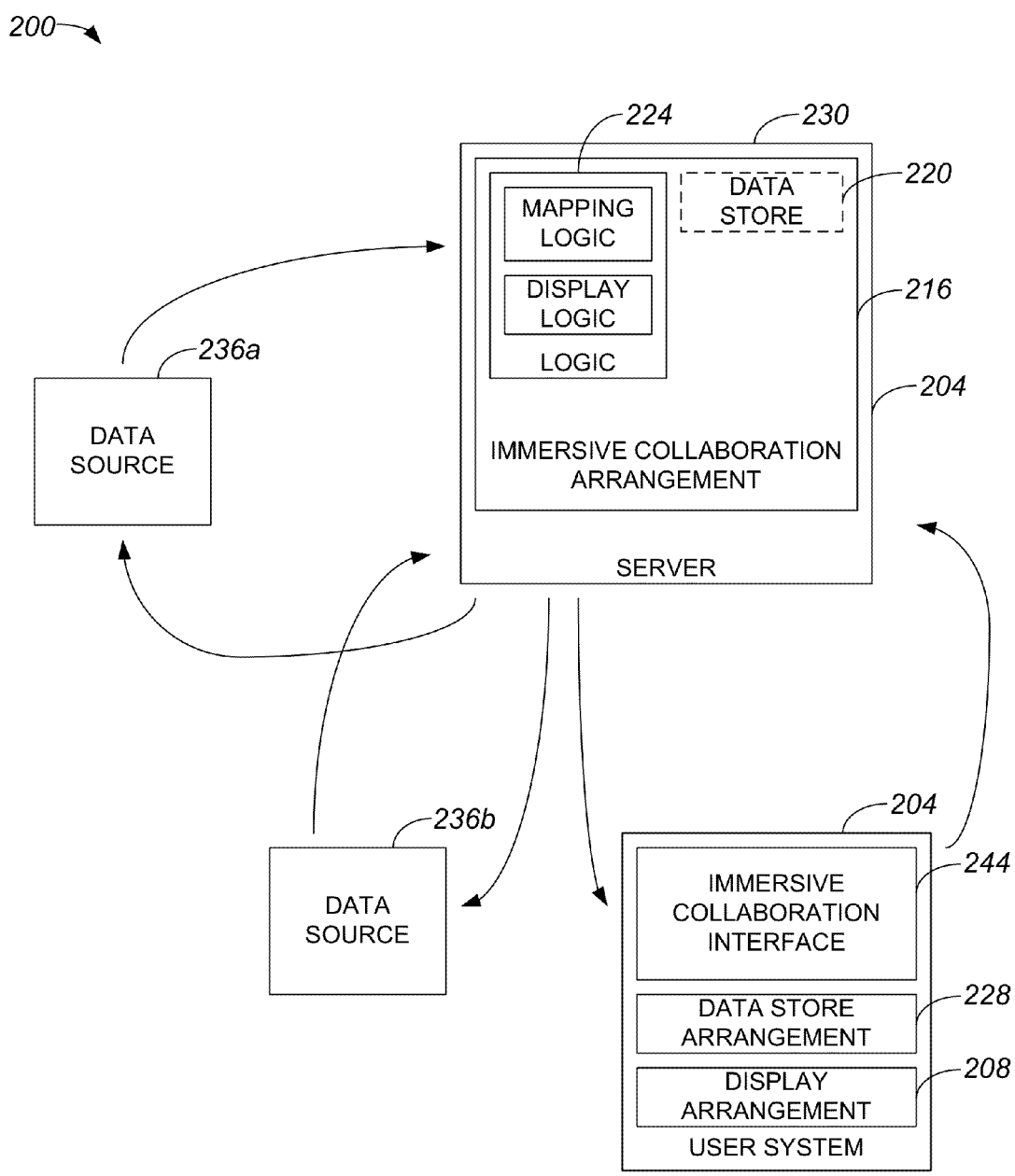
FIG. 2 is a diagrammatic representation of a network in which a user system has access to a centralized immersive collaboration arrangement in accordance with an embodiment.

As mentioned above, an immersive collaboration system may be substantially centralized such that it executes on a server that may then be accessed by any number of user systems. FIG. 2 is a diagrammatic representation of a network in which a user system has access to a centralized immersive collaboration arrangement in accordance with an embodiment. A network 200 includes a server 230, at least one user system 204, and a plurality of data sources 236a, 236b. Server 230 includes an immersive collaboration arrangement 216 and, in one embodiment, may be a web server. User system 204 is a computing system or other device associated with a user who is a part of a collaborative project. Data sources 236a, 236b may store collaborative data, e.g., data files, that are used by immersive collaboration arrangement 216 to effectively generate a dynamic timeline that displays representations of the collaborative data.

Immersive collaboration arrangement 216 includes logic 224 and an optional data store 220. Logic 224 includes mapping logic and display logic that is configured to obtain collaborative data, as for example from data stores 236a, 236b and from user system 204, and to process the collaboration logic such that a collaboration space may be presented on user system 204. Collaborative data obtained by immersive collaboration arrangement 216 may be stored on user system 204 in a data store arrangement 228.

A user of user system 204 may use an immersive collaboration interface 244 in order to access immersive collaboration arrangement 216. Immersive collaboration interface 244 may include, but is not limited to including, logic which enables immersive collaboration arrangement 216 to be accessed and logic which essentially enables a collaboration space obtained from immersive collaboration arrangement 216 to be displayed on a display arrangement 208. In one embodiment, immersive collaboration interface 244 may include an optional memory arrangement or data store which allows information relating to the collaboration space to be stored.

As previously mentioned, a dynamic timeline is an example of a collaboration mapping interface which allows users to visualize, navigate, manipulate, and re-use collaborative data or collaboration information in an immersive environment. A dynamic timeline may be presented graphically or pictorially in a collaboration space presented on a display screen. The dynamic timeline may display the collaborative data as different types of collaboration events, e.g., such that the collaboration events are identifiable based upon a shape, size, surface texture, or color of icons used to represent the collaboration events. Thus, a dynamic timeline effectively provides a focal point that allows different types of collaboration events to be substantially linked. For example, a dynamic timeline may effectively link collaboration events including, but not limited to including, phone calls, teleconferences, emails, weblogs, two-dimensional and three-dimensional third party applications, instant messages, live recordings, and/or ad hoc events. In one embodiment, icons used to represent collaboration events may be time-based such that a current collaboration event, e.g., a collaboration event that is presently in process, may be substantially highlighted. Such a current collaboration event may be effectively highlighted, for example, by having the current collaboration event flash, move, be highlighted by a halo, and/or be brighter than other collaboration events displayed on a timeline.

Figure 3:
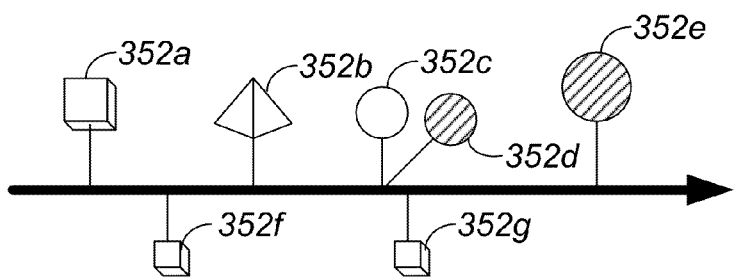
FIG. 3 is a diagrammatic representation of a timeline that provides a graphical representation of different types of collaboration events associated with a collaborative project in accordance with an embodiment.

FIG. 3 is a diagrammatic representation of a dynamic timeline that provides a graphical representation of different types of collaboration events associated with a collaborative project in accordance with an embodiment. A timeline 348, which may be represented in a collaboration space of an overall immersive collaboration platform, is effectively a mapping of a collaborative project. That is, timeline 348 may be a representation of a collaboration map. The collaboration map may, for example, be a representation of a team collaborative project.

In general, a collaboration space may be visually presented on a display screen, and timeline 348 may include a plurality of different collaboration events 352a-g. However, it should be appreciated that timeline 348 may instead be a representation of a collaboration map that, in turn, represents a personal project of a user rather than a team collaborative project. In other words, although timeline 348 is generally associated with a team collaborative project, timelines 348 is not limited to being associated with a team collaborative project.

Timeline 348 is dynamic in that a length of timeline 348 increases as the length of a project or a collaboration space history substantially extends in time. In addition, as more collaboration events 352a-g become a part of the collaboration space history, those collaboration events 352a-g may also be added to timeline 348. To facilitate visibility, a user may be able to dynamically alter the length of timeline 348, extend or compress timeline 348 graphically, and/or essentially lower or increase collaboration event icon density on timeline 348. By way of example, the density of collaboration events 352a-g along timeline 348 may be lowered to make certain collaboration events 352a-g more visible. In one embodiment, dynamic filtering may be applied such that certain collaboration events 352a-g may be displayed along timeline 348 while others are substantially removed, or such that certain collaboration events 352a-g are displayed, at least temporarily, more prominently than others.

Collaboration events 352a-g are generally ordered on timeline 348 chronologically, e.g., older events are towards the beginning of timeline 348 while more recent events are towards the end of timeline 348. Collaboration events 352a-g may be, as shown, represented by various, substantially three-dimensional shapes, although collaboration events 352a-g may instead be represented by any visual icons. In one embodiment, different shapes represent different types of collaboration events 352a-g. By way of example, a cube shape may represent three-dimensional events such as a team review of a 3D solid-model mechanical assembly, a pyramid shape may represent a conference call, and a sphere shape may represent a document or similar application.

The size of the shapes may represent the length or displayed area of the associated collaboration event 352a-g, e.g., a larger size may indicate a longer call or document. In general, the size or displayed area of a collaboration event 352a-g may be dependent upon the amount of content and/or the importance associated with collaboration event 352a-g. The length or displayed area of collaboration event 352a may be longer than the length of collaboration event 352f, for instance, as the size of the cube representing collaboration event 352a is larger than the size of the cube representing collaboration event 352f.

The color of the shapes may represent particular aspects of a collaboration event 352a-g. For instance, a color may indicate a type of document, or a color may effectively identify members of a collaborative project who participated in the collaboration event 352a-g.

In one embodiment, a shade of a color may indicate the importance of a collaboration event 352a-g. By way of example, a lighter shade of a given color may indicate that a collaboration event 352a-g is relatively low in importance, whereas a darker shade of the given color may indicate that a collaboration event 352a-g is relatively high in importance. A collaboration event 352a-g could also be custom-coded using unique individual or group preferences, such as "red-yellow-green", for example to denote collaboration event status, where green may denote a "go-ahead" or relatively high status. An individual preference may be a preference that relates to how collaboration events 352a-g are displayed to a particular user, and a group preference may be a preference that relates to how collaboration events 352a-g are displayed to a set of members of a collaboration.

Alternatively, the importance of a particular collaboration event 352a-g may be indicated by the height of the particular collaboration event 352a-g relative to the height of other collaboration events 352a-g. That is, whether a particular collaboration event 352a-g is higher or lower than other particular collaboration events 352a-g may be an indication of the relative importance of the particular collaboration event 352a-g. The importance of a collaboration event 352a-g may generally be determined based on any number of criteria including, but not limited to including, the importance of a participant in a particular collaboration event 352a-g, and/or the frequency with which the particular collaboration event 352a-g is referenced or accessed. For example, because collaboration event 352e is shown as being higher above timeline 348 than other collaboration events, collaboration event 352e may have been more frequently accessed than other collaboration events.

If two collaboration events occur at approximately the same time, as shown by collaboration events 352c, 352d, those collaboration events may be shown at substantially the same point along timeline 348. In one embodiment, a user may be able to graphically "push aside" one of collaboration events 352c, 352d with a touch screen or cursor interface for better accessibility to the other collaboration event 352c, 352d.

Collaboration events 352a-g on timeline 348 may also be collapsed and expanded for better visibility. For example, if collaboration events 352c, 352d occur on the same day, they could be logically clustered and/or collapsed into a substantially single icon representing that day's aggregate collaboration events. A new meta-icon may then be displayed in place of collaboration events 352c, 352d. Such a new meta-icon may be expanded to display the full set of collaboration, e.g., collaboration events 352c, 352d. In addition, icons can be associated at multiple nested levels to improve usability and visibility, as will be described below with reference to FIGS. 9A and 9B.

Timeline 348 is typically arranged to be manipulated. When timeline 348 is displayed on a display screen associated with a computing device, a user may manipulate a cursor (not shown) to cause different actions to occur. Selecting a collaboration event 352a-f may cause information associated with the collaboration event 352a-f to be displayed, e.g., selecting collaboration event 352c may cause an associated document to be displayed. That is, individual collaboration events 352a-f may be queried such that information associated with the individual collaboration events 352a-f may effectively be divulged. In one embodiment, "wanding over" timeline 348 with a cursor (not shown) may cause some details of each collaboration event 352a-f to be displayed as the cursor passes over each collaboration event 352a-f.

Figure 4:
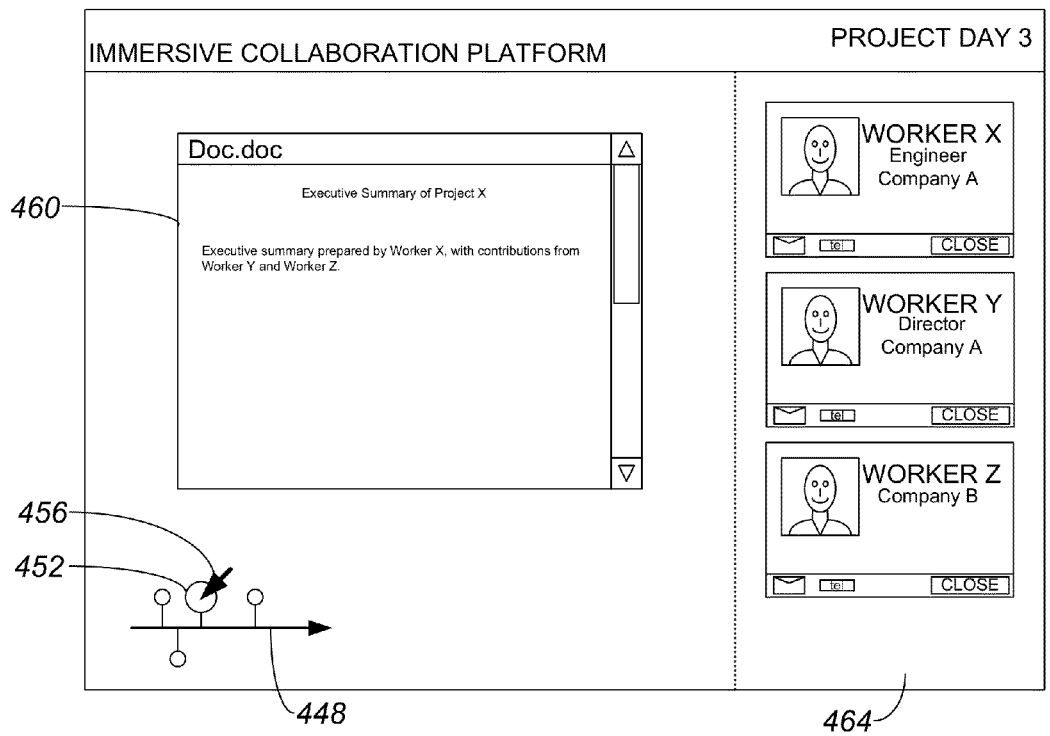
FIG. 4 is a diagrammatic representation of a collaboration space, e.g., display, in which information relating to a collaboration event is displayed in accordance with an embodiment.

As previously mentioned, timeline 348 may be displayed in a collaboration space of an overall immersive collaboration platform. With reference to FIG. 4, a collaboration space or map in which information relating to a collaboration event is displayed will be described in accordance with an embodiment. A collaboration space 454 is configured as a visual interface to a system (not shown) that generates, collects, and retains collaboration events and associated data. As shown, collaboration space 454 includes a dynamic timeline 448. In the described embodiment, dynamic timeline 448 includes a collaboration event 452, which is represented by a sphere-shaped icon, that is selected by a user using a cursor 456. It should be appreciated that although collaboration event 452, as well as other collaboration events on timeline 448, are represented by a sphere-shaped icon, collaboration event 452 and other collaboration events may generally be represented by any number of different icons.

Collaboration event 452, as shown, is a document 460. Thus, when collaboration event 452 is selected or otherwise activated, document 460 opens within collaboration space 454. Document 460 may either be displayed such that a user may view document 460 but may not edit document 460, or document 460 may be arranged to be both viewed and edited by the user. In one embodiment, when collaboration event 452 is selected, an application suitable for allowing document 460 to be manipulated is opened within collaboration space 454. For example, a document editing application that is external to the overall immersive collaboration platform may be opened when document 460 is selected from timeline 448.

Collaboration event 452 may be associated with particular participants. Because collaboration event 452 is associated with document 460, the authors of document 460 and/or participants otherwise involved with document 460 may be identified as being associated with collaboration event 452. In one embodiment, the parties associated with collaboration event 452 may be members of an overall collaborative project that is effectively represented by timeline 448. An area 464 of collaboration space 454 is arranged to display information about the parties associated with collaboration event 452 or, more generally, the parties associated with a selected collaboration event. It should be appreciated, however, that area 464 may instead display information about substantially all members of the overall collaborative project. The information displayed may include, but is not limited to including, names of the participants, titles of the participants, and contact information relating to the participants. Area 464 may include links or icons which may be activated to allow a user to substantially send an email or initiate a phone call or teleconference, to substantially initiate an instant messaging session, or to use other means of electronic collaboration tools in the immersive space, for example, with respect to a participant for whom information is displayed in area 464.

Figure 5:
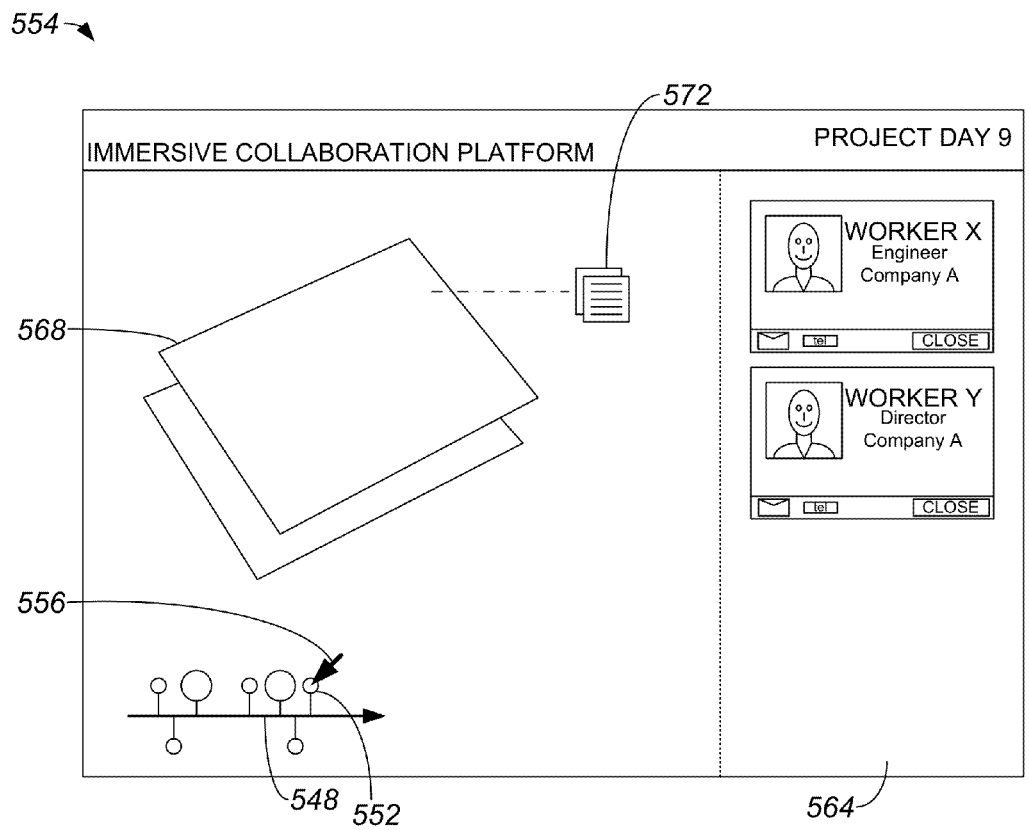
FIG. 5 is a diagrammatic representation of a collaboration space, e.g., display, in which an integrated three-dimensional display relating to a collaboration event is displayed in accordance with an embodiment.

While a collaboration event may be associated with a document, as discussed with respect to FIG. 4, a collaboration event may also be associated with any suitable three-dimensional application, for example, a mechanical engineering solid-modeling program. FIG. 5 is a diagrammatic representation of a collaboration space in which an integrated three-dimensional display relating to a collaboration event is displayed in accordance with an embodiment. A collaboration space 554 includes a dynamic timeline 548 which includes a collaboration event 552 that is selected by a user, e.g., using a cursor 556. Collaboration event 552 is associated with a shared, integrated three-dimensional application 568. Hence, when collaboration event 552 is selected, or substantially opened, application 568 may be opened. Application 568 may be tagged with dynamic events or data. As shown, application 568 may be tagged with a document 572, which is associated with a two-dimensional annotation. In other words, application 568 may be identified as being associated with document 572.

In a portion 564 of collaboration space 554, information relating to participants associated with application 568 may be displayed. That is, information that identifies members of a collaborative project who are involved with application 568 may be displayed in portion 564.

Figure 6:
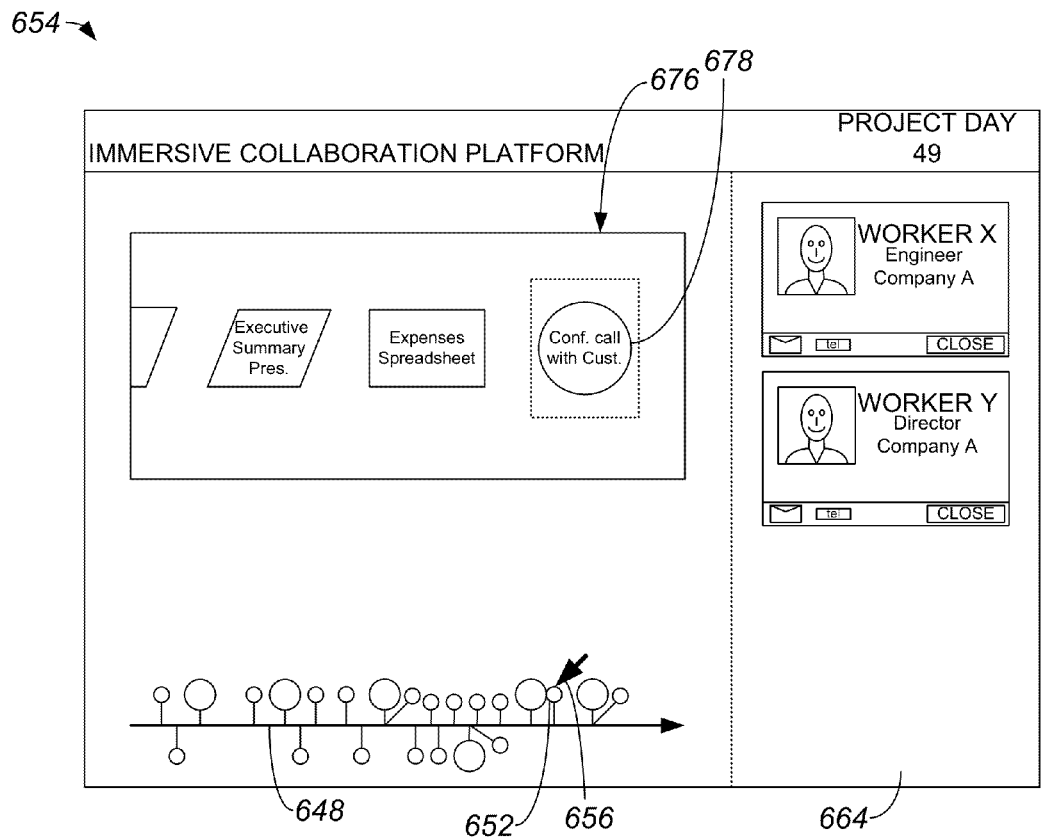
FIG. 6 is a diagrammatic representation of a collaboration space, e.g., display, in which a time slider feature is incorporated with respect to a timeline in accordance with an embodiment.

A timeline in a collaboration space, as mentioned above, may be configured to allow a user to effectively query collaboration events to obtain identifying information relating to the collaboration events. For example, as a user slides a cursor through or over a timeline, identifying information for collaboration events may be displayed as the cursor slides over the collaboration events. FIG. 6 is a diagrammatic representation of a collaboration space, e.g., display, in which a time slider feature is incorporated with respect to a timeline in accordance with an embodiment. A collaboration space 654 is associated with an immersive collaboration environment that supports a time slider feature. When a cursor 656 is wanded over or otherwise controlled to slide over timeline 648 or, more specifically, over collaboration events such as collaboration event 652, information relating to the collaboration events may appear in a time slider window 676.

As shown, cursor 656 is positioned over collaboration event 652. In the described embodiment, collaboration event 656 is a conference call. Hence, an indication 678 that collaboration event 652 is a conference call is provided in time slider window 676. Indication 678, which may include an icon and descriptive text, may be highlighted to identify indication 678 as being associated with collaboration event 652. Highlighting indication 678 may serve to differentiate indication 678 from other icons displayed in time slider window 676. Further, the user may access sub-data such a text transcript or audio replay of 652 through time slider window 676.

An area 664 is arranged to display information about members involved with a collaborative project. The members displayed may be the members associated with collaboration event 652. However, it should be appreciated that the members displayed are not limited to those members associated with collaboration event 652. By way of example, substantially all members involved with the collaborative project may be displayed.

Figure 7:
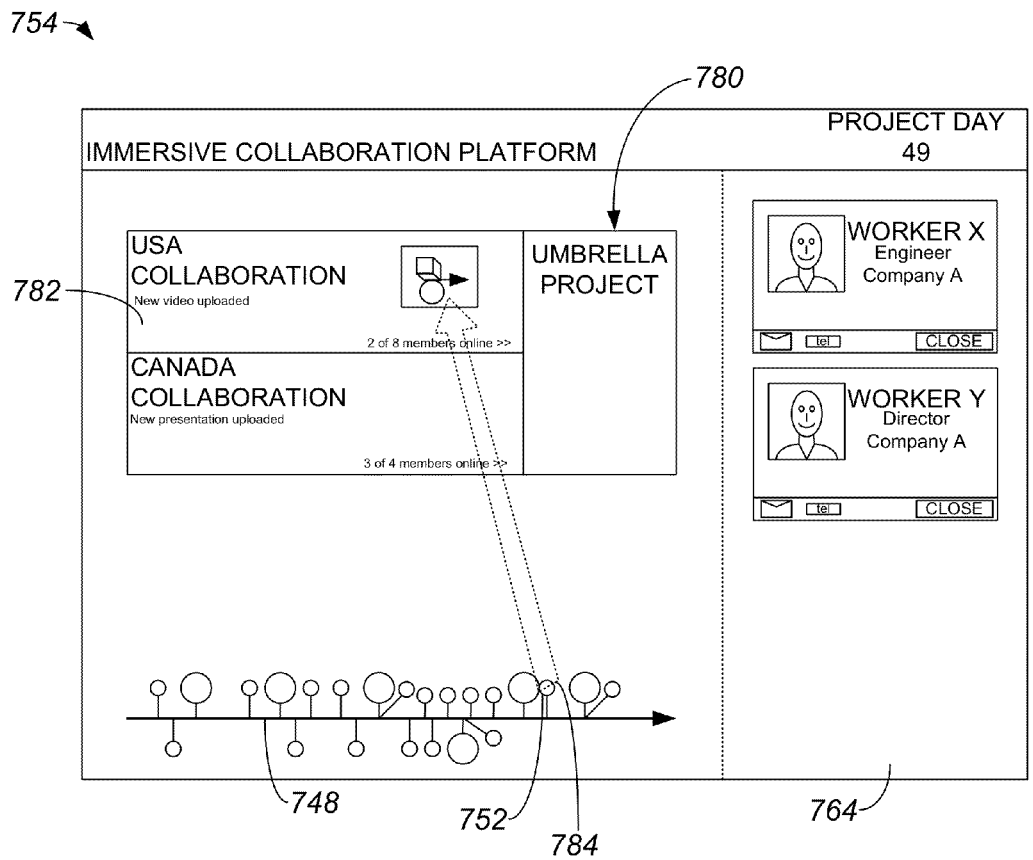
FIG. 7 is a diagrammatic representation of a collaboration space, e.g., display, in which a portion of a timeline, e.g., an event, may be added into a collaboration in accordance with an embodiment.

An immersive collaboration platform may be configured to allow collaboration data associated with one collaboration to be copied into another collaboration. A full timeline, or part of a timeline, may substantially be incorporated into another timeline, or may be shared between multiple timelines. For instance, a collaboration event included in a timeline for one collaboration may be copied into a timeline for another collaboration. Referring next to FIG. 7, a collaboration space in which a portion of an timeline, e.g., a collaboration event, may be copied into or otherwise added into a collaboration in accordance with an embodiment. A collaboration space 754 includes a dynamic timeline 748 and a project window 780. Project window 780 includes information relating to at least one collaboration 782. In the described embodiment, timeline 748 is not associated with collaboration 782.

As indicated by arrow 784, a collaboration event 752 that is a part of timeline 748 may be substantially copied into collaboration 782. Copying collaboration event 752 into collaboration 782 may allow collaboration event 752 to be incorporated into a timeline (not shown) relating to collaboration 782.

In the described embodiment, area 764 may be arranged to display information relating to members of a collaboration project associated with timeline 748. Specifically, in the described embodiment, area 764 may display information on members of the collaboration project associated with timeline 748 who were involved with collaboration event 752.

Figure 8:
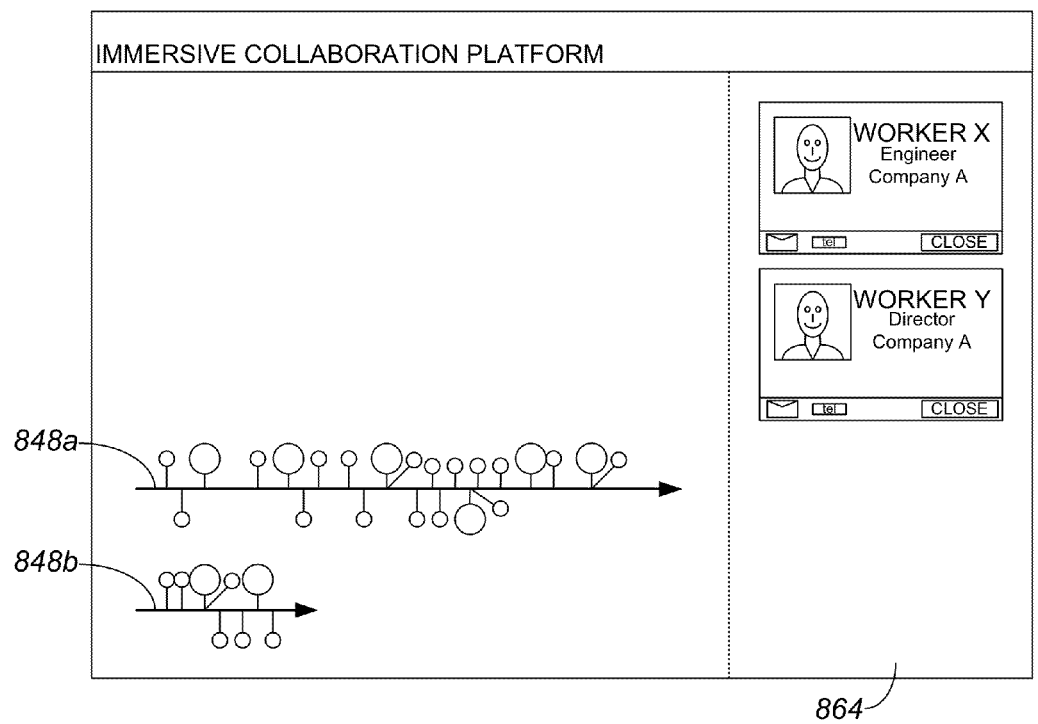
FIG. 8 is a diagrammatic representation of a collaboration space, e.g., display, which includes multiple timelines in accordance with an embodiment.

Information may be shared between collaborative projects. As discussed above, collaborative events may be shared between different timelines. To facilitate the sharing of collaborative events, timelines associated with different collaborative projects may be displayed substantially concurrently in a collaboration space. For example, showing multiple timelines or mappings within a collaboration space may enable different projects to be readily compared. FIG. 8 is a diagrammatic representation of a collaboration space in which timelines associated with different collaborative projects are displayed in accordance with an embodiment. A collaboration space 854 includes a first dynamic timeline 848a and a second dynamic timeline 848b. First dynamic timeline 848a may be associated with a first collaborative project, while second dynamic timeline 848b may be associated with a second collaborative project.

Collaboration space 854 allows collaboration events in one timeline 848a, 848b to be dragged into the other timeline 848a, 848b. When a particular collaboration event in first timeline 848a is to be dragged into second timeline 848b, for example, the collaboration event may either be moved or copied.

An area 864 may show information pertaining to members associated with a particular collaboration event or collaborative project. In one embodiment, area 864 may show information pertaining to participants in both the first collaborative project and the second collaborative project.

Figure 9A:
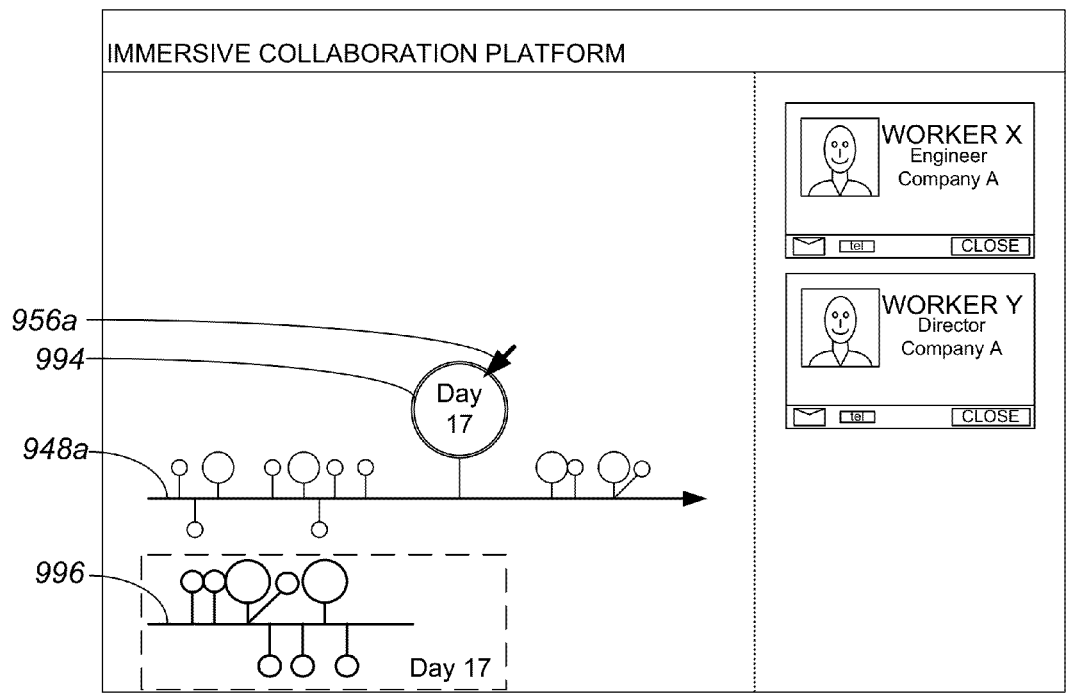
FIG. 9A is a diagrammatic representation of a collaboration space, e.g., display, in which a meta-icon is used to represent a first aggregation of collaboration events in accordance with an embodiment.

As previously mentioned, a meta-icon may be formed to aggregate together multiple collaboration events. For example, a meta-icon may be formed and, thus displayed on a timeline, to represent substantially all collaboration events occurring on a given day, or to represent substantially all of a particular type of collaboration event. With reference to FIG. 9A, a meta-icon which represents substantially all collaboration events relating to a particular time period will be described in accordance with one embodiment, and with reference to FIG. 9B, a meta-icon which represents substantially all of one type of collaboration event will be described in accordance with another embodiment.

FIG. 9A is a diagrammatic representation of a collaboration space, e.g., display, in which a meta-icon is used to represent a first aggregation of collaboration events in accordance with an embodiment. A collaboration space 954a includes a dynamic timeline 948a on which collaboration events are displayed. A meta-icon 994, which represents a particular time period with respect to timeline 948a, is effectively an aggregation of substantially all collaboration events which occurred during the particular time period. As shown, meta-icon 994 is arranged to aggregate substantially all collaboration events which occurred on "day 17." Hence, instead of display collaboration events which occurred on "day 17" on timeline 948a, meta-icon 994 is displayed instead.

When a user selects meta-icon 994, as for example when a cursor 956a is placed over meta-icon 994, the collaboration events associated with meta-icon 994 may be displayed. In the described embodiment, the collaboration events associated with meta-icon 994 are displayed as a segment 996 of a timeline. Segment 996 may be highlighted, as well as essentially magnified, to draw a user's attention to segment 995 when cursor 956a is placed over meta-icon 994. It should be appreciated that in lieu of segment 996 being displayed when cursor 956a is placed over meta-icon 994, or when meta-icon 994 is otherwise selected, the collaboration events associated with meta-icon 994 may be displayed in a variety of different way. For example, the collaboration events associated with meta-icon 994 may be displayed in a separate window, displayed on meta-icon 994, and/or displayed on timeline 948a.

In one embodiment, each collaboration event is associated with metadata and, as such, tags may be added to the metadata to identify characteristics of each collaboration event. By way of example, a telephone call may be tagged such that a date of the telephone call, a length or duration of the telephone call, the participants of the telephone call, the importance assigned to the telephone call, and/or the subject matter of the telephone call may be identified in the metadata. Thus, when a meta-icon is to be created, a search through metadata associated with, e.g., stored with, collaboration events may be performed to effectively identify collaboration events that are appropriate for aggregating into the meta-icon. For instance, to form meta-icon 994, metadata may be searched to identify collaboration events which occurred on "day 17."

Figure 9B:
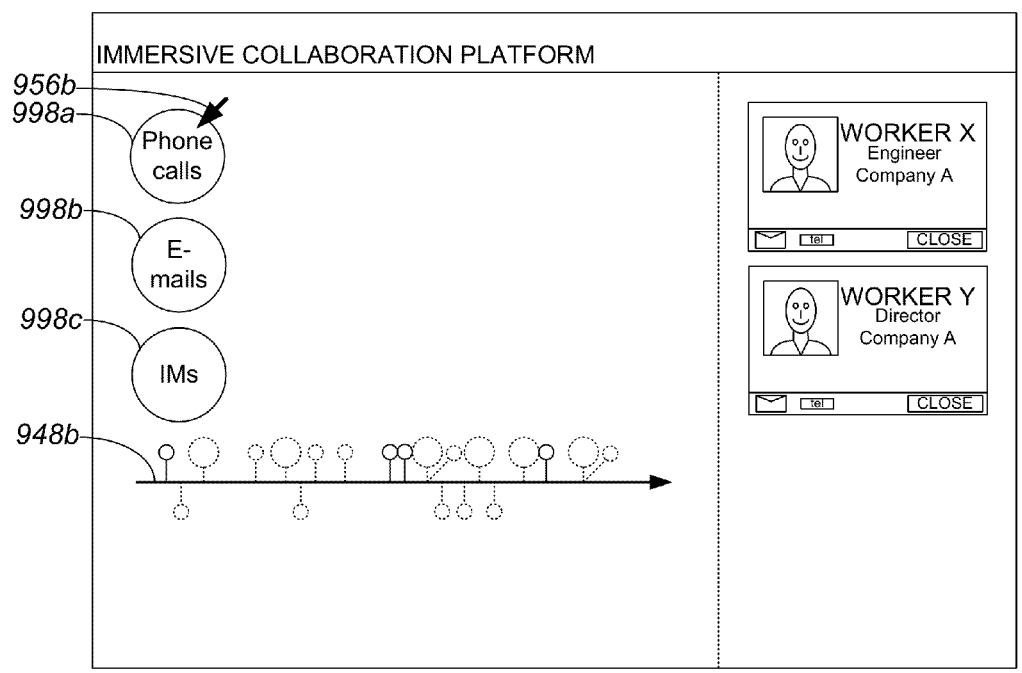
FIG. 9B is a diagrammatic representation of a collaboration space, e.g., display, in which a meta-icon is used to represent a second aggregation of collaboration events in accordance with an embodiment.

Different types of collaboration events may be represented as meta-icons such that substantially all instances of one type of collaboration event may be aggregated into a single meta-icon. For example, all telephone calls which are associated with a collaboration may be aggregated into a single meta-icon. FIG. 9B is a diagrammatic representation of a collaboration space, e.g., display, in which a meta-icon is used to represent a second aggregation of collaboration events in accordance with an embodiment. A collaboration space 954*b* includes a dynamic timeline 948*b* on which collaboration events associated with a collaboration are displayed. Meta-icons 998*a-c*, which each represent a particular type of collaboration event, are displayed within collaboration space 954*b*. When a meta-icon 998*a-c* is selected, the collaboration events represented by the meta-icon 998*a-c* may be displayed on timeline 948*b*. Displaying the collaboration events may include highlighting those collaboration events represented by the selected meta-icon 998*a-c* on timeline 948*b*, or may alternately include displaying only those collaboration events represented by the selected meta-icon 998*a-c* on timeline 948*b*.

As shown, a cursor 956*b* is positioned over meta-icon 998*a* such that collaboration events, e.g., telephone calls, represented by meta-icon 998 are highlighted on timeline 948*b*. Highlighting collaboration events associated with meta-icon 998*a* along timeline 948*b* may include substantially displaying those collaboration events associated with meta-icon 998*a* "in front" of other collaboration events by pushing the collaboration events not associated with meta-icon 998*a* behind or to the side of those collaboration events associated with meta-icon 998*a*. Alternatively, highlighting the collaboration events associated with meta-icon 998*a* with respect to timeline 948*b* may include visually highlighting those collaboration events, e.g., by displaying those collaboration events with halos or having those collaboration events flash. In general, substantially any suitable method may be used to highlight collaboration events along timeline 948*b* when an associated meta-icon 998*a-c* is essentially selected.

Figure 10:
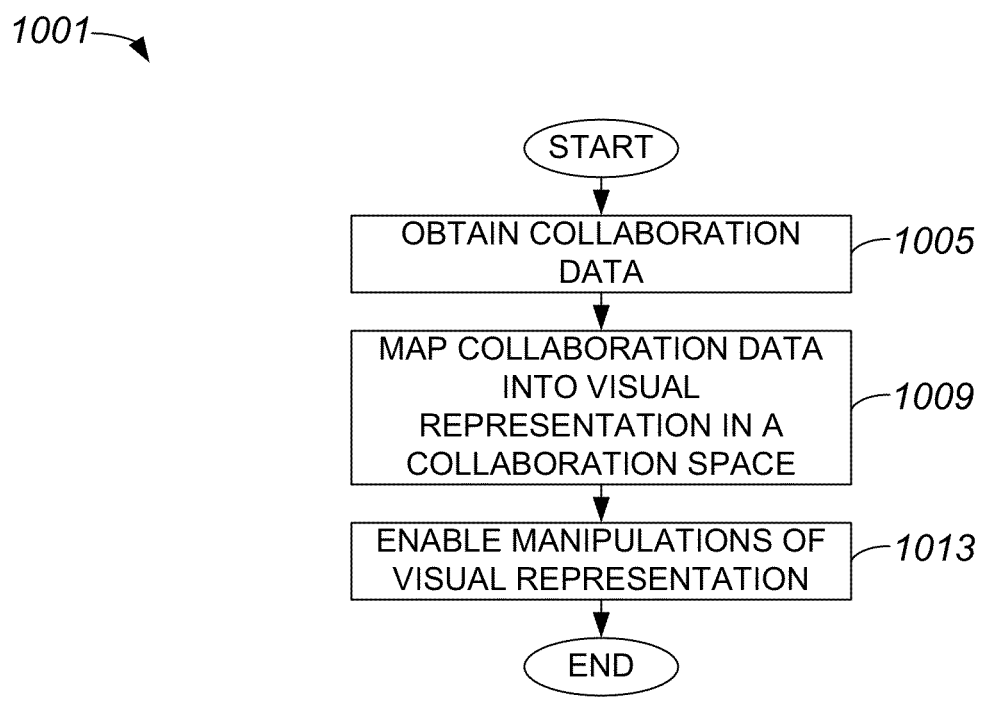
FIG. 10 is a process flow diagram which illustrates a method of providing an immersive collaboration environment in accordance with an embodiment.

FIG. 10 is a process flow diagram which illustrates a method of providing an immersive collaboration environment in accordance with an embodiment. A process 1001 of providing an immersive collaboration environment begins at step 1005 in which collaboration data is obtained. The collaboration data may be obtained from a variety of different sources, as previously mentioned. Once the collaboration data is obtained, the collaboration data may be mapped in step 1009 into a visual representation in a collaboration space. That is, a visual representation, e.g., a three-dimensional visual representation may be created from the collaboration data such that the visual representation may be displayed on a display screen. After the visual representation is substantially created, manipulations of visual representation are enabled in step 1013, and the process of providing an immersive collaboration environment is completed. Enabling manipulations generally includes supporting, facilitating, and otherwise allowing manipulations to be made.

Although only a few embodiments have been described, it should be understood that the present disclosure may be embodied in many other specific forms without departing from the spirit or the scope of the present disclosure. By way of example, when a collaboration event is displayed in a collaboration space or map, information relating to the participants in that collaboration event has been described as being displayed in the collaboration space. However, instead of displaying information relating substantially only to those participants involved with the collaboration event, information relating to substantially all members of a collaborative project which included the collaboration event may be displayed. Alternatively, a user may configure his or her collaboration space to display information relating to only specific members of a collaborative project such that information relating to only those members is displayed, even for collaboration events including more than just those members.

A collaboration space may be configured to suggest collaboration events or collaborative projects that may be of interest to a user. For instance, the collaboration space of a user involved with a first collaborative project may identify other collaborative projects which have members in common with the first collaborative project as potentially being of interest to the user. The collaboration space may also identify a collaboration event that is associated with more than one collaborative project, and notify a user that there is more than one collaborative project associated with the collaboration event.

Dynamic contextual data may be displayed in a collaboration space without departing from the spirit or the scope of the present disclosure. For example, if during a teleconference-based collaboration event a key word, such as the name of another collaboration space, occurs, then the collaboration environment may display the associated collaboration timeline map. Further, dynamic contextual data may be incorporated into a collaborative environment by tying or tagging a new data stream and importing the new data stream as part of the collaboration event. A collaboration engine that tags substantially all collaboration events has dynamic contextual search capabilities to tag and import stored events, as well as events occurring in real time. In one embodiment, if there is real time instant messaging session that is relevant to a particular collaboration, the instant messaging session may be dragged into the new timeline and collaboration space.

In one embodiment, the configuration of icons, e.g., substantially three-dimensional shapes, used to represent collaboration events, may be arranged to effectively identify individuals associated with the events. For example, each member of a collaborative project may be associated with a particular color, and icons representing collaboration events involving a member may include a stripe, a dot, or the like in a color associated with the member. Thus, any icon with that color may be readily identified as being associated with that member. Alternatively, features present on icons may identify an icon as being associated with a member. For instance, a particular letter or shape superimposed on an icon may identify the icon as being associated with a particular member. Alternatively, a dynamic informational tag, e.g., a tag associated with metadata for a collaboration event, with the user's information may appear when a cursor is placed proximal to the icon It should be appreciated that the visual representations of a collaboration space, as described above, are examples of suitable visual representations. In general, the visual representations may vary widely without departing from the spirit or the scope of the present disclosure. That is, the manner of presenting an interface that allows members of a collaborative project to manage collaborative information may vary. For example, in lieu of being represented as a dynamic timeline, collaborative data may be represented in an immersive environment in a tabular format.

A collaboration space may be arranged to be configured by a user. In other words, a user may select parameters that are used by an immersive collaboration platform to present collaboration data to the user. By way of example, a user may choose the icons to be used to represent collaboration events in a dynamic timeline. Alternatively, it should be appreciated that the icons used to represent collaboration events may be substantially universal, or otherwise arranged such that a user does not have a choice as to which icons are to represent particular collaboration events.

As mentioned above, a collaboration map may illustrate the relative importance of collaboration events. Visual techniques including, but not limited to including, showing icons floating at different distances over or under a timeline, and thickening the timeline to represent a higher number of participants may be used to denote the importance and/or the criticality of collaboration events. Factors used in assessing the importance and/or criticality of collaboration events may include assessing how often the events are referenced by members of a collaborative project, accounting for preferences of a particular user, the rank or authority of participants in the collaboration events, and the like.

Collaborative data may generally include data relating to documents or other files that are relevant to a collaborative project, as well as events relating to the collaborative project. In other words, collaborative data may include any suitable type of data. For instance, collaborative data may include, but is not limited to including, document files, spreadsheet files, video files, audio files such as those associated with phone calls, presentation files, recordings of conversations, and/or information relating to collaboration events such as conference calls and telepresence sessions.

A collaboration space or mapping is generally an application, e.g., a software tool, and device agnostic that may accept data, including data relating to events, from a number of different sources, as mentioned above. The sources of data may include, but are not limited to including, computing systems and end devices maintained by substantially individual users and/or enterprises, as well as any suitable data storage arrangements maintained by individual users and/or enterprises.

In one embodiment, a collaboration space may be configured to enable a user to manage personal projects as well as team collaborative projects, e.g., by fostering data integration. Such a collaboration space may provide a user interface that allows a user to efficiently search, organize, prioritize, play, and/or otherwise utilize collaboration events and associated data. The user interface may support or sustain efficient knowledge management, and may allow collaboration data to essentially be reused within a collaboration space. The user interface may also support features which allow collaboration data to be reused and/or replayed. By way of example, when collaboration data is associated with a telepresence session, the user interface may allow the telepresence session to effectively be replayed within the collaboration space.

A dynamic timeline may be collapsed into a single icon without departing from the spirit or the scope of the present disclosure. When a dynamic timeline is collapsed into a single icon, a user may copy the icon into an email, for example, to send the dynamic timeline to a recipient. When the recipient receives such an email, the recipient may activate the icon, e.g., by clicking on the icon, to display the dynamic timeline.

While meta-icons have been described as substantially aggregating collaboration events which occurred during a given time period or a particular type of collaboration event, it should be appreciated that meta-icons may represent substantially any attribute associated with collaboration events. For instance, a meta-icon may be created to represent substantially all collaboration events attended by, or otherwise associated with, a particular member of the collaboration. In addition, a meta-icon may be arranged to aggregate more than one attribute, e.g., a meta-icon may represent all phone calls which occurred on a given date. Meta-icons may also be "nested" to further compact and intelligently aggregate collaboration event information. In one embodiment, a meta-icon may include other subordinate or nested meta-icons. This scheme allows an icon that may represent all phone calls on a certain day, for example, to be a peer to another icon representing all videoconferences on the same day, with both icons subordinated to a meta-icon representing substantially all events contained on the prescribed day. Hence, manipulating a meta-icon that represents substantially all events contained on a prescribed day may cause subordinated meta-icons to be displayed and, further, allow for those subordinated meta-icons to be manipulated.

In one embodiment, meta-icons which represent particular types of collaboration events may be arranged such that more than one meta-icon may be selected at any given time. By way of example, a meta-icon which represents all phone calls associated with a collaboration and a meta-icon which represents all emails associated with a collaboration may both be selected such that all phone calls and all emails may be displayed or highlighted as collaboration events on a timeline, while all other types of collaboration events associated with the collaboration are not displayed.

The embodiments may be implemented as hardware and/or software logic embodied in a tangible medium that, when executed, is operable to perform the various methods and processes described above. That is, the logic may be embodied as physical arrangements or components. A tangible medium may be substantially any computer-readable medium that is capable of storing logic which may be executed, e.g., by a computing system, to perform methods and functions associated with the embodiments. Such computer-readable mediums may include, but are not limited to including, physical storage devices. Software logic may include, but is not limited to including, computer program code and program code devices.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples are not to be limited to the details given herein, but may be modified within the scope of the appended claims.

What is claimed is:

1. A method comprising:
  obtaining collaboration data from at least one data source;
  mapping the collaboration data into a visual representation of a collaboration map in a collaboration space, wherein the visual representation is arranged to be manipulated to cause details associated with a collaboration to be displayed in the collaboration space; and
  enabling manipulations of the visual representation, wherein the visual representation includes a dynamic timeline and enabling the manipulations of the visual representation includes allowing a length of the timeline to be altered, wherein mapping the collaboration data into the visual representation includes identifying a first collaboration event in the collaboration data and mapping the first collaboration event into a first discrete icon associated with a first geometrical shape, the first discrete icon being included along the dynamic timeline and arranged to indicate at least one selected from the group including an importance with respect to the first collaboration event and a type associated with the first collaboration event, and wherein mapping the collaboration data into the visual representation further includes identifying a second collaboration event in the collaboration data and mapping the second collaboration event into a second discrete icon associated with a second geometrical shape, the second geometrical shape being differentiable from the first geometrical shape, the second discrete icon being included along the dynamic timeline and arranged to indicate at least one selected from the group including an importance with respect to the second collaboration event and a type associated with the second collaboration event.

2. The method of claim 1 further including:
allowing the first discrete icon to be selected; and
displaying the first collaboration event separate from the dynamic timeline when the first discrete icon is selected, the first collaboration event being arranged to be manipulated in the collaboration space, wherein the details associated with the collaboration include details associated with the first collaboration event, and wherein displaying the first collaboration event includes displaying the details associated with the first collaboration event.

3. The method of claim 2 wherein the first collaboration event is associated with a three-dimensional application, and wherein the three-dimensional application is arranged to be manipulated in the collaboration space.

4. The method of claim 1 further including:
displaying information relating to the first collaboration event in the collaboration space, the information relating to the first collaboration event being displayed separately from the first discrete icon.

5. The method of claim 1 wherein the first collaboration event is associated with at least one participant, the method further including:
displaying information that identifies the at least one participant, the information being displayed in the collaboration space.

6. The method of claim 1 wherein the collaboration is a team collaborative project.

7. The method of claim 1 wherein mapping the collaboration data into the visual representation further includes identifying a first document in the collaboration data and mapping the first document into a third discrete icon included on the dynamic timeline, and wherein enabling manipulations of the visual representation includes enabling the first document to be viewed and edited.

8. The method of claim 7 wherein enabling the first document to be edited includes causing a document editing application to be opened.

9. The method of claim 1 wherein enabling the visual representation further includes at least one selected from a group including allowing the timeline to be expanded and allowing the timeline to be compressed.

10. Logic embodied on a non-transitory tangible media that, when executed, is operable to:
obtain collaboration data from at least one data source;
map the collaboration data into a visual representation of a collaboration map in a collaboration space, wherein the visual representation is arranged to be manipulated to cause details associated with a collaboration to be displayed in the collaboration space; and
enable manipulations of the visual representation, wherein the visual representation includes a dynamic timeline and the logic operable to enable the manipulations of the visual representation is operable to allow a length of the timeline to be altered, wherein the logic operable to map the collaboration data into the visual representation is operable to identify a first collaboration event in the collaboration data and to map the first collaboration event into a first discrete icon associated with a first geometrical shape, the first discrete icon being included along the dynamic timeline and arranged to indicate at least one selected from the group including an importance with respect to the first collaboration event and a type associated with the first collaboration event, and wherein the logic operable to map the collaboration data into the visual representation is further operable to identify a second collaboration event in the collaboration data and to map the second collaboration event into a second discrete icon associated with a second geometrical shape, the second geometrical shape being differentiable from the first geometrical shape, the second discrete icon being included along the dynamic timeline and arranged to indicate at least one selected from the group including an importance with respect to the second collaboration event and a type associated with the second collaboration event.

11. The logic of claim 10 further operable to:
allow the first discrete icon to be selected; and
display the first collaboration event separate from the dynamic timeline when the first discrete icon is selected, the first collaboration event being arranged to be manipulated in the collaboration space, wherein the details associated with the collaboration include details associated with the first collaboration event, and wherein the logic operable to display the first collaboration event is operable to display the details associated with the first collaboration event.

12. The logic of claim 11 wherein the first collaboration event is associated with a three-dimensional application, and wherein the three-dimensional application is arranged to be manipulated in the collaboration space.

13. The logic of claim 10 further operable to:
display information relating to the first collaboration event in the collaboration space, the information relating to the first collaboration event being displayed separately from the first discrete icon.

14. The logic of claim 10 wherein the first collaboration event is associated with at least one participant, the logic further operable to:
display information that identifies the at least one participant, the information being displayed in the collaboration space.

15. An apparatus comprising:
means for obtaining collaboration data from at least one data source;
means for mapping the collaboration data into a visual representation of a collaboration map in a collaboration space, wherein the visual representation is arranged to be manipulated to cause details associated with a collaboration to be displayed in the collaboration space; and
means for enabling manipulations of the visual representation, wherein the visual representation includes a dynamic timeline and the means for enabling the manipulations of the visual representation include means for allowing a length of the timeline to be altered, wherein the means for mapping the collaboration data into the visual representation include means for identifying a first collaboration event in the collaboration data and mapping the first collaboration event into a first discrete icon associated with a first geometrical shape, the first discrete icon being included along the dynamic timeline and arranged to indicate at least one selected from the group including an importance with respect to the first collaboration event and a type associated with the first collaboration event, and wherein the means for mapping the collaboration data into the visual representation further include means for identifying a second collaboration event in the collaboration data and means for mapping the second collaboration event into a second discrete icon associated with a second geometrical shape, the second geometrical shape being differentiable from the first geometrical shape, the second discrete icon being included along the dynamic timeline and arranged to indicate at least one selected from the group including an importance with respect to the second collaboration event and a type associated with the second collaboration event.

16. An apparatus comprising:
a networking arrangement, the networking arrangement being arranged to obtain collaboration data associated with a collaborative project; and
an immersive collaboration arrangement, the immersive collaboration arrangement being configured to process the collaboration data by mapping the collaboration data into at least a first visual representation including a first icon and a second icon, the first visual representation being arranged to be presented in a manipulatable format within a collaboration space, wherein the first icon is a representation of an editable document and the second icon is one selected from a group including a representation of a meeting and a representation of a call, the first icon having a size based on an amount of content in the editable content, the second icon having a size based on one selected from a group including a length of the meeting and a length of the call, and wherein the first visual representation is a dynamic timeline.

17. The apparatus of claim 16 wherein the networking arrangement is configured to obtain the collaboration data from a plurality of data sources.

18. The apparatus of claim 17 wherein at least one of the plurality of data sources is remote with respect to the apparatus.

19. The apparatus of claim 16 wherein the collaboration data is associated with at least a first collaboration event.

20. The apparatus of claim 19 wherein mapping the collaboration data into at least the first visual representation includes mapping the at least first collaboration event into at least the first icon included on the dynamic timeline.

21. The apparatus of claim 20 wherein the collaboration data is further associated with a second collaboration event, and wherein mapping the collaboration data into at least the first visual representation further includes mapping the second collaboration event into the second icon included on the dynamic timeline, wherein the first icon is arranged to identify the first collaboration event and the second icon is configured to identify the second collaboration event.

22. The apparatus of claim 21 wherein the first visual representation is arranged to indicate levels of importance with respect to the first collaboration event and the second collaboration event.

23. The apparatus of claim 19 further including a display arrangement, the display arrangement being configured to display the dynamic timeline.

* * * * *